Dec. 8, 1959 A. W. BEISHLINE 2,916,202
FLIGHT TRACK RECORDER
Filed Aug. 11, 1953 7 Sheets-Sheet 1

Fig. 1

INVENTOR.
ALLEN W. BEISHLINE
BY
ATTORNEYS

Dec. 8, 1959 A. W. BEISHLINE 2,916,202
FLIGHT TRACK RECORDER

Filed Aug. 11, 1953  7 Sheets-Sheet 2

INVENTOR.
ALLEN W. BEISHLINE
BY
ATTORNEYS

Dec. 8, 1959   A. W. BEISHLINE   2,916,202
FLIGHT TRACK RECORDER
Filed Aug. 11, 1953   7 Sheets-Sheet 5

INVENTOR.
ALLEN W. BEISHLINE
BY
ATTORNEYS

Dec. 8, 1959     A. W. BEISHLINE     2,916,202
FLIGHT TRACK RECORDER Filed Aug. 11, 1953     7 Sheets-Sheet 6

Fig. 11

INVENTOR.
ALLEN W. BEISHLINE
BY
ATTORNEYS

United States Patent Office 2,916,202
Patented Dec. 8, 1959

2,916,202

FLIGHT TRACK RECORDER

Allen W. Beishline, Philadelphia, Pa.

Application August 11, 1953, Serial No. 373,697

11 Claims. (Cl. 235—58)

(Granted under Title 35, U.S. Code (1952), sec. 266)

The invention described herein may be manufactured and used by or for the Government of the United States of America for governmental purposes without the payment of any royalties thereon or therefor.

The present invention relates to an automatic navigation system designed especially for airborne operation, and, more particularly, to a continuously operating dead reckoning mechanism for computing and plotting the course and the ground speed of an aircraft in which this equipment is installed.

In order to produce a continuous record of such information, it is necessary to provide for appropriate movement of a pen across a fixed map to trace the speed and direction of flight, or to cause a map to be moved under a relatively fixed pen in such a manner that the ground track will be traced upon the map by the pen. Several previous attempts have been made to develop automatic navigational equipment suitable for use in aircraft. However, in each of these attempts a pen has been moved over a relatively fixed map by mechanisms producing simultaneous rectilinear motion of the pen along mutually perpendicular paths to produce a resultant trace. In all of these efforts the results were never entirely satisfactory, because the mechanisms used were all characterized by the requirement that the movement of the stylus be translated into ordinate values. This continuous integration of the forward movement into at least two variables necessarily resulted in cumulative errors, seriously limiting the accuracy of such equipment.

In contrast to previous developments in this field, the instant invention includes a plotting system in which a map is moved beneath a fixed pen assembly. Moreover, the instant invention makes use of polar coordinate representations of input and output quantities throughout the system. This design feature results in several design and operational simplifications of the equipment, making possible substantially increased accuracy over extended periods of operation. In addition, since the computer portion of the instant invention is designed to operate entirely on the basis of polar coordinates, it inherently conforms to the system in which wind and heading information are customarily expressed and available. Consequently, the mechanical representation of this information as inputs in the computer is greatly facilitated.

In the preferred embodiment described below, the instant invention includes four interconnected components, a course and ground speed computer, a chart board, a servo amplifier, and a power supply. Operating from servo inputs of compass heading and true air speed and from manual inputs of wind direction and wind speed, this device continuously computes course and ground speed of the aircraft in which this equipment is installed. On the face of the course and ground speed computer are dials which indicate compass heading, course, and drift angle, and counters which indicate values of true air speed and ground speed. An additional dial and counter indicate the wind direction and the wind speed, respectively, both of which are manually introduced into the computer by means of suitable hand cranks. In order to provide a continuous record of the ground position of the aircraft, the computed values of course and ground speed are fed to the chart board, which continuously operates in response to this information to produce an inked line representing the aircraft's ground track on a circular section of a suitable chart as it is moved beneath a centrally disposed fixed pen assembly by the drive mechanism of the chart board.

Since the novel features of the instant invention reside in the course and ground speed computer assembly and in the chart board assembly, these components will be described in detail below. On the other hand, while a plurality of servo amplifier units and a power supply are essential to the operation of the instant invention, they each comprise conventional elements interconnected by conventional circuitry. Accordingly, they will not be described in detail. In practice, these two components may be combined within a single housing interconnected by suitable electrical circuits with both the computer assembly and the chart board assembly.

An object of the present invention is the provision of an improved flight track recorder mechanism.

Another object is to provide a flight track recorder capable of continuous automatic operation over an extended period.

A further object of the invention is the provision of a flight track recorder which may be operated independently of ground stations and ground fixes, and, therefore, is suitable for operation over open water and over unfriendly territory in complete radio silence.

Still another object is to provide a flight track recorder mechanism in which the configuration of the chart board is such that the pen continuously remains stationary at the center of the chart board, representing the present position of the aircraft, while the ground-stabilized chart is maneuvered under the pen to trace a line representing the ground track that the aircraft is following.

A final object of the present invention is the provision of a simplified computer mechanism in which the various mechanical components correspond directly with vectorial representations of the respective inputs and outputs.

Other objects and many of the attendant advantages of this invention will become apparent to those skilled in the art as the same becomes better understood by reference to the following detailed description considered in connection with the accompanying drawings wherein:

Figure 1:
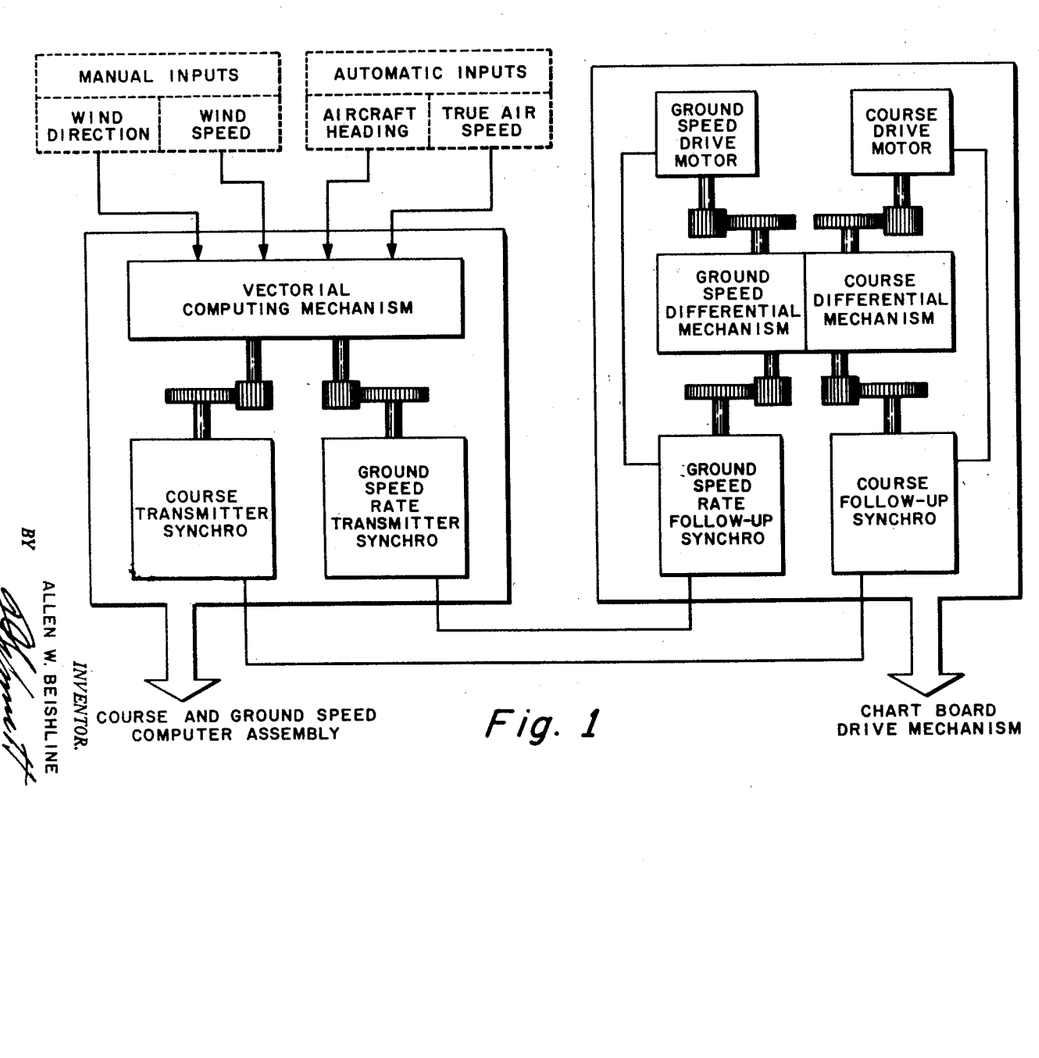
Fig. 1 shows a diagrammatic representation of the relationship between the course and ground speed computer assembly and the chart board drive mechanism of the instant invention.

Referring now to the drawings, wherein like reference characters designate like or corresponding parts throughout the several views, there is shown in Fig. 1 a diagrammatic representation of the instant invention indicating the nature of the inputs to the course and ground speed computer assembly and the manner in which these inputs are supplied thereto; the outputs continuously calculated by the computer assembly; the manner in which the information supplied by the computer assembly is transmitted through an electrical connection to the remotely located chart board drive mechanism; the electrical connections in the chart board drive mechanism between the ground speed follow-up synchro and the ground speed drive motor, and between the course follow-up synchro and the course drive motor whereby impulses from the respective follow-up synchros control energization and hence rotation of their respective drive motors; and representations of the mechanical connections between the drive motors and the respective differential components of the drive mechanism, and thence to the respective follow-up synchros.

Figure 2:
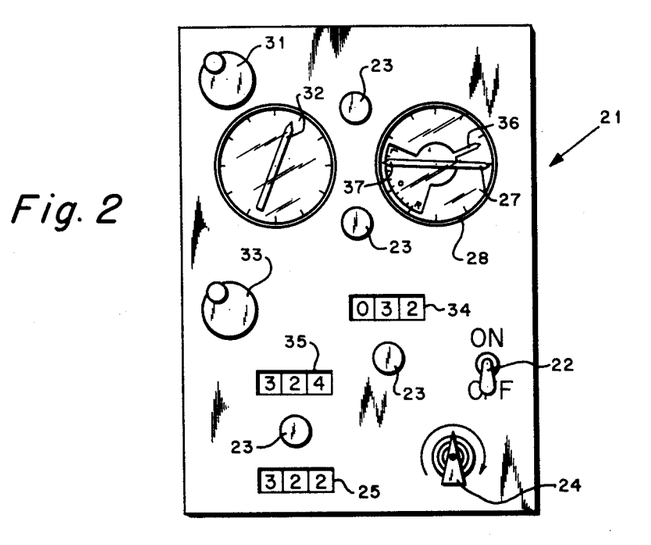
Fig. 2 shows a preferred embodiment of the face of the course and ground speed computer indicating a suitable arrangement of the various dials, counters and hand cranks thereon, Fig. 3 includes a plan view and a side elevation of a preferred embodiment of the chart board assembly.

Fig. 2 illustrates a preferred embodiment of the front face of the computer assembly, generally designated by the reference numeral 21. This panel includes an "on-off" switch 22 for the entire system comprising the present invention, a plurality of bulbs 23 for edge lighting the panel, and a brightness control 24 for these bulbs. The respective inputs fed to, and outputs calculated by the computer assembly are indicated by suitable indicating means mounted on this panel. The true air speed is continuously supplied as input to the computer assembly through a servo amplifier from a suitable air speed measuring instrument. In addition, the true air speed is indicated on the panel by the counter 25. The compass heading is continuously supplied as an input to the computer assembly through a servo amplifier from a suitable compass mechanism. The compass heading is also continuously indicated on the panel by the needle 27 in the indicator assembly 28. The wind direction is supplied manually to the computer assembly by means of crank 31 on the panel and this direction is continuously represented by the needle 32. The wind speed is supplied manually to the computer assembly by crank 33. The wind speed is also continuously indicated on the panel by counter 34. The ground speed, computed as an output by the computer assembly, is indicated by counter 35. The course also computed as an output is indicated by the pointer 36. The size and direction of the drift angle is indicated by the relative position of the reverse end of needle 27 and the zero point on the scale at the reverse end of pointer 36.

Figure 3:
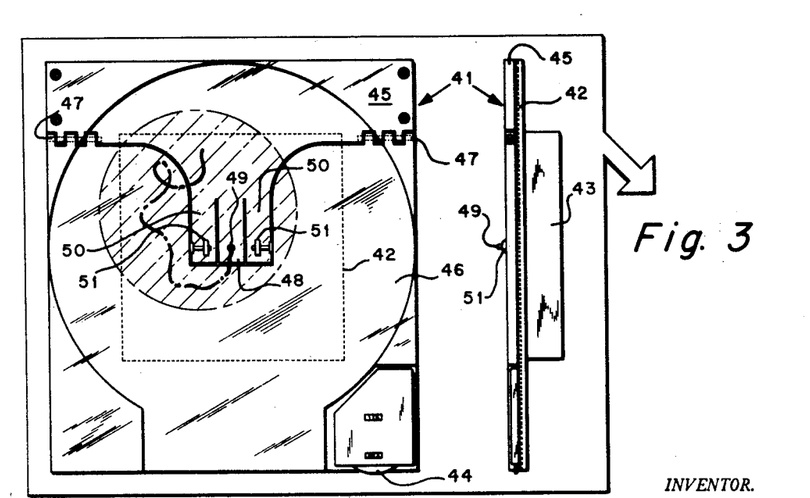

The showing in Fig. 3 includes two views of the chart board assembly, generally designated by the numeral 41. This assembly includes a backing plate 42 on the reverse side of which is mounted a housing 43 enclosing the chart board drive mechanism and the speed changing mechanism for regulating the speed at which the drive mechanism operates to correspond with the scale of the chart being used. The speed changing mechanism is controlled by the rotatable wheel 44 mounted at one corner of the chart board assembly. The upper surface of the backing plate 42 is entirely covered by a transparent cover sheet in two sections. One section of the transparent cover sheet, designated by the numeral 45, is secured fixedly to the backing plate 42. The movable section of the transparent cover sheet, designated by numeral 46, is connected by suitable hinge means to the fixed portion 45. The hinges are designated in Fig. 3 by the numeral 47. The upper surface of the backing plate 42 is so shaped that a shallow centrally disposed generally circular space is provided beneath the cover sheet to accommodate a relatively smaller circular chart and movement thereof as indicated in Fig. 3. Section 45 of the cover sheet includes a projecting portion divided into three parallelly extending finger members disposed over the central portion of the chart board assembly. The centrally disposed finger 48 supports the pen assembly 49 arranged to project downwardly in operative relationship to a chart or map placed beneath it. The outer fingers 50 each support a roller member 51 arranged to bear downwardly against the chart or map at a point at which the chart is contacted from underneath by a driving wheel of the drive mechanism. For details of this drive mechanism see the showing in Figs. 11, 12, and 13.

The chart board described above is designed especially for use in restricted space. However, it can be modified for use in large multi-engine aircraft by making the board larger so that it will accommodate larger charts. With such an arrangement the instant invention will function for extended periods between changes of the chart.

Figure 4:
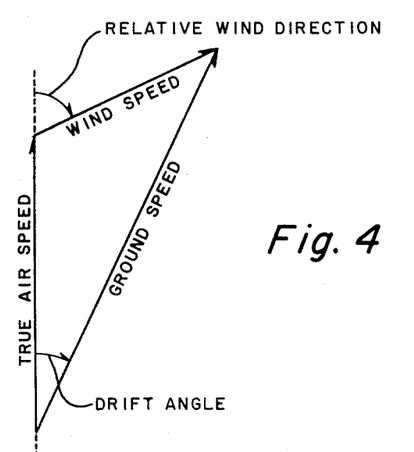
Fig. 4 is a vector diagram of the factors involved in aircraft navigation.

Fig. 4 is a diagrammatic representation of the factors involved in aircraft navigation, wherein each of these factors is represented vectorially. The diagram shown in Fig. 4 is the basis upon which the computer used in the instant invention is designed. This computer assembly sets up a mechanical miniature vector triangle corresponding to the one illustrated in Fig. 4 whose size and shape is continuously defined by the input quantities supplied to the computer, namely, true air speed, compass heading, wind speed, and relative wind direction. This vector triangle mechanism also continuously measures the output quantities determined by this computer assembly, namely, ground speed and drift angle. Moreover, the computer assembly also includes a differential mechanism in which the drift angle is continuously added algebraically to the compass heading to produce an indication of the course.

Figure 5:
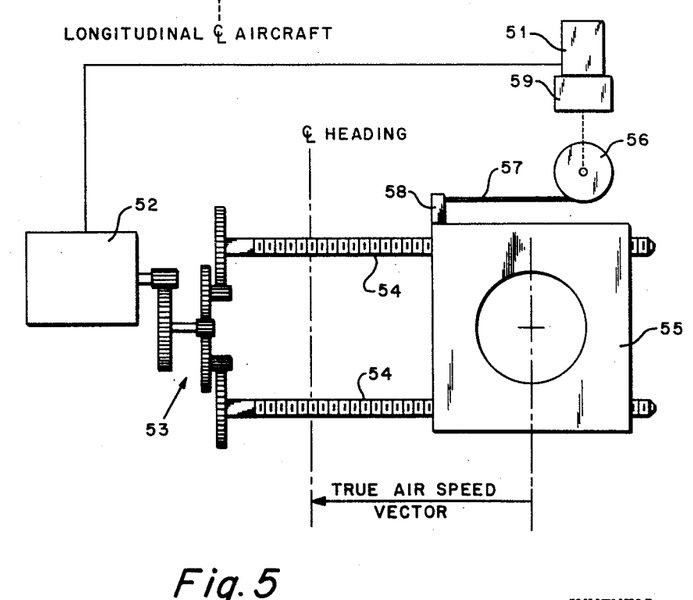
Fig. 5 is a schematic representation of the drive mechanism for the mechanical element representing true air speed in the vectorial computing mechanism of the computer assembly.

The mechanism within the computer assembly which is responsive to the true air speed input is schematically represented in Fig. 5. This showing includes the mechanical system continuously positioned to correspond to the true air speed, the drive mechanism therefor, and the sensing unit by means of which the drive mechanism is controlled. Information regarding the true air speed may be supplied to the computer assembly by any suitable means such as a Kollsman true air speed transmitter including a conventional transmitting synchro, not shown, which with a synchro 51 used as a control transformer forms a positional servo system in which the information as to air speed is transferred electrically to produce a shaft rotation. This shaft rotation is proportional to the true air speed and creates a signal energizing the motor 52 operable through a suitable gear train 3 to rotate twin lead screws 54 in turn operative to produce translational movement of a carriage 55. As the carriage 55 is moved a spring loaded pulley 56 rotates in response to corresponding changes in the length of the cable 57 attached at one end by means of fitting 58 to the carriage 55. Since the pulley 56 is mounted coaxially with and connected to the control transformer 51, its rotation acts to neutralize the signal emanating from the control transformer to energize the motor 52. Accordingly, movement of the carriage 55 ceases when it reaches a position corresponding to true air speed because, at that point, the rotation of the pulley 56 has neutralized the signal completely. The position of the carriage 55 is always such that the distance between the center line of the true air speed carriage and the center line of the heading assembly of the computer represents the true air speed vector. In addition to the operation described above, the value of the true air speed is continuously indicated on the counter 25, shown in Fig. 2, by a suitable mechanical connection between this counter and the true air speed lead screws 54.

A significant feature of this design is the fact that the true air speed vector and the mechanism by which it is represented does not rotate with respect to the computer housing to indicate changes in the aircraft's heading. Instead, a heading change causes an equal and opposite change in the angular position of the mechanism representing the relative wind direction as explained in detail below with respect to Figs. 6 and 7. This unique arrangement is desirable for two reasons: first, because, it minimizes engineering difficulties in designing and constructing this equipment; and second, it permits a substantial reduction in the size of the computer assembly by eliminating the necessity of swinging a relatively large mechanism angularly about a circle of relatively large diameter which would have to be enclosed within the housing of the computer assembly.

The control transformer 51 may be provided with a corrector mechanism 59 adjustable to compensate for any inaccuracies in the true air speed transmitter. The details of one such corrector mechanism adjustable at 15° intervals about its circumference and particularly well suited for use in this device are described fully in co-pending application No. 343,268, of A. W. Beishline et al., now U.S. Patent No. 2,741,900, issued April 17, 1956.

Figure 6:
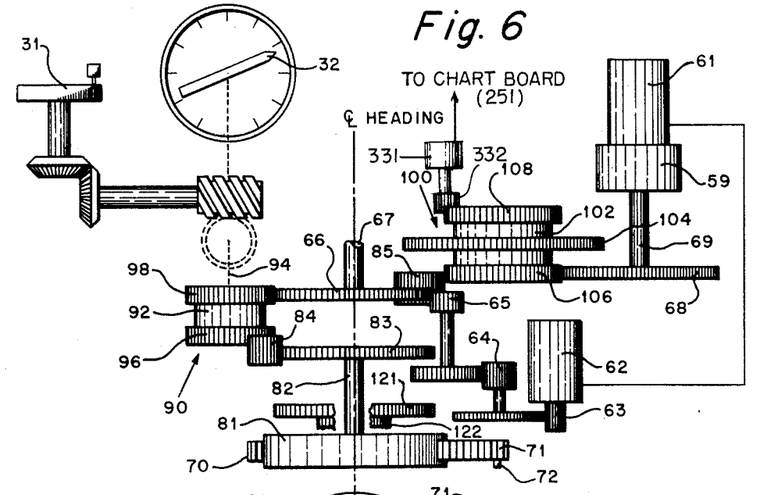
Fig. 6 is a schematic representation of the particular components within the vectorial computing mechanism of the computer assembly which are responsive to the relative wind direction and the compass heading of the aircraft.

Information from a suitable precision remote indicating directional reference, such as a flux-gate compass, may be transmitted as a shaft rotation by a suitable positional servo system consisting of a conventional transmitting synchro, not shown, responsive to the position of the compass, and a synchro used as a control transformer identified in Fig. 6 by the numeral 61. The synchro 61 is also preferably provided with a corrector mechanism 59 of the type described above in connection with synchro 51. In this application the corrector may be adjusted to compensate for compass deviation.

The mechanisms shown schematically in Figs. 6, 8, 12 and 13 each include at least one differential assembly. In the preferred embodiment, each such differential assembly consists of a centrally disposed spider assembly mounted upon a supporting shaft and a pair of internal gears rotatably mounted upon the supporting shaft on opposite sides of the spider assembly and intermeshed with a plurality of spur gears contained in the spider assembly and rotatably mounted on pins disposed parallel to the supporting shaft, whereby said internal gears rotate in opposite directions relative to said spider assembly. The details of one such differential assembly, particularly well adapted for these applications, are described fully in co-pending application No. 353,924 of A. W. Beishline, and now abandoned.

Fig. 6 is a simplified representation of the gear train by means of which the arm 70 representing the relative wind vector is positioned angularly in response to changes in compass heading or to a change in the wind direction.

This arm 70 is slidably mounted for movement along a diameter of the circular supporting member 81 fixedly secured to a shaft 82 for rotation therewith. Hence, arm 70 rotates with member 81 about the axis of rotation of shaft 82. With this arrangement the shaft 82 may be rotated to position arm 70 angularly according to the direction of the relative wind. The showing in Fig. 7 is provided to facilitate an understanding of this arrangement as represented in Fig. 6.

First, assuming that the wind direction is steady in the direction indicated by pointer 32, a change in the course of the aircraft causes the synchro transmitter associated with the flux-gate compass to transmit a signal to the control transformer 61 shown in Fig. 6. In response to the signal imposed on the control transformer 61, motor 62 is energized for rotation in the direction corresponding to the sense of said signal. This rotation of the drive motor 62 is transmitted through gears 63, 64 and 65, to gear 66 fixedly attached to the shaft 67 rotatably supported in a position in axial alignment with shaft 82 and spaced therefrom. Rotation of gear 66 is in turn transmitted through idler gear 85 and gear 106 of the differential assembly 100 to gear 68 fixedly secured to the shaft 69 of control transformer 61, so that gear 68 is rotated in the direction of rotation tending to neutralize the signal imposed on control transformer 61. In addition, the rotation of gear 66 is transmitted through differential assembly 90 to a duplicate gear 83 fixedly mounted on shaft 82. When the wind direction is steady in any given direction the shaft represented by the line designated by numeral 94 to which the spider assembly 92 is fixedly attached remains stationary so that the differential mechanism 90 acts purely as a reversing mechanism in which gears 98 and 96 rotate at the same rate in opposite directions. The rotation of gear 96 is in turn reversed and transmitted to gear 83 by idler gear 84. Since gear 83 duplicates gear 66 both in size and in the number of teeth it is rotated in the same direction and at the same rate as gear 66, thereby modifying the angular position of arm 70 in response to the signal imposed on the control transformer 61. It should be noted at this point that this rotation of the arm 70 in one direction is in lieu of rotation in the opposite direction of the mechanism shown in Fig. 5 which represents the true air speed vector. With this arrangement, it is possible in the instant invention to fixedly mount the mechanism shown in Fig. 5 within the computer assembly, since this reverse rotation of the wind arm in response to changes in course is effective to continuously maintain the proper angular relationship between the respective mechanisms shown in Fig. 5 and in Figs. 6 and 7.

Second, assuming a fixed course with no signal imposed on control transformer 61 and therefore no rotation of drive motor 62 and the gear train driven thereby, a change in wind direction is introduced into the computer assembly by manual operation of the crank 31 until the pointer 32 is directed to the new wind direction. This operation of the crank 31 will produce rotation of the shaft represented in Fig. 6 by a line designated by the numeral 94 and the spider assembly 92, fixedly secured thereto. This rotation of the spider assembly 92, with gear 98 held relatively fixed due to its engagement with gear 66, will produce an amplified rotation of gear 96 transmitted through idler 84 to the gear 83 to produce angular rotation of gear 83 and hence of arm 70 relative to the gear 66. Thus, changes in wind direction may be introduced into the mechanism shown in Fig. 6 to produce a corresponding change in the angular position of arm 70 independent of the effect of drive motor 62 as controlled by control transformer 61 upon the position of the arm 70, in response to the heading and changes thereof.

Figures 7, 8:
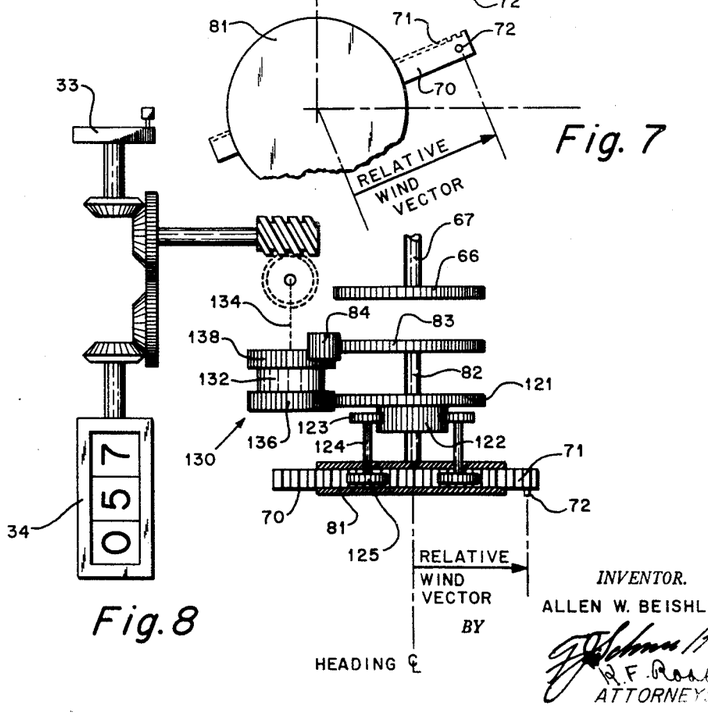
Fig. 7 is a detailed plan view of the radially and angularly adjustable arm within the vectorial computing mechanism which corresponds to the relative wind vector.
Fig. 8 is a schematic representation of the particular component within the vectorial computing mechanism which is responsive to the wind speed.

The showing in Fig. 8 includes certain components in the mechanism shown in Fig. 6 and, in addition, the essential components of an additional system not shown in Fig. 6 in order to avoid undue complexity in the respective figures. Gear 66 is again shown mounted upon the shaft 67 disposed in coaxial alignment with the shaft 82 to which the duplicate gear 83 is fixedly attached and upon which another duplicate gear 121 is freely mounted for independent rotation thereon. Both gear 121 and the cooperating gear 122 fixedly secured thereto are shown also in Fig. 6 in order to indicate the spacial relationship of gears 121 and 122 to the portions of the mechanism shown only in Fig. 6. The differential assembly generally designated by numeral 130 is shown disposed in operative relationship to gears 83 and 121. In this case as in that of the differential assembly 90 described above in relation to Fig. 6, the spider assembly 132 of differential assembly 130 is fixedly secured to the shaft represented in Fig. 8 by a line designated by the numeral 134. The lower gear 136 of the differential assembly is shown in engagement with the gear 121. The upper gear 138 is operably connected through idler 84 to the gear 83. It should be noted at this point that the idler gear 84 shown in Fig. 8 is the same gear as the one shown in Fig. 6 interconnecting gear 96 and gear 83. With this particular arrangement it is possible to modify the wind direction setting without modifying the wind speed setting of arm 70 which is obtained and modified by the mechanism shown in Fig. 8 in the manner described immediately below.

A change in the wind speed is introduced into the computer assembly by manual operation of the crank 33 until the new wind speed appears on counter 34. This rotation of the crank 33 produces rotation of the shaft 134 and of the spider assembly 132 fixedly attached thereto. Assuming that gear 83 is momentarily at rest for the purpose of this discussion, the gear 84 and gear 138 will also be stationary. Accordingly, rotation of the spider assembly 132 will produce amplified rotation of the gear 136 in the same direction and hence a corresponding rotation of the fixedly interconnected gears 121 and 122 about shaft 82.

This angular displacement of the gear 122 is in turn transmitted through a pair of gears 123, shafts 124, and gears 125 to the rack 71 along one side of the arm 70, thus displacing the arm 70 radially by an amount corresponding to the change in the wind speed.

In order to facilitate the description of the various regulating systems included in the mechanism shown in Figs. 6, 7 and 8, each of these regulating systems was described assuming the other systems at rest. However, this mechanism is so arranged that all of these systems may operate simultaneously yet independently to impose their cumulative effect on the positioning, both angularly and radially, of the arm 70.

As indicated schematically in Figs. 6 and 8 by means of the representation of a worm gear, both the wind direction and the wind speed input trains have a unidirectional worm and wheel drive which prevents movement of components within the computer mechanism from changing the values of wind direction and wind speed set in by the hand cranks 31 and 33, respectively.

Figure 9:
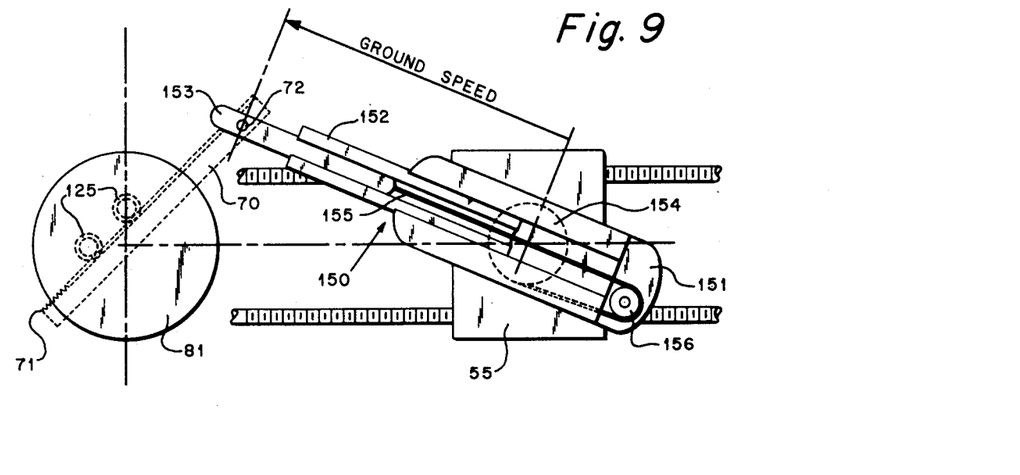
Fig. 9 is a schematic representation of the mechanism within the vectorial computing mechanism by means of which the ground speed is continuously measured.

Fig. 9 is a schematic representation of the mechanism within the computer assembly operative to continuously measure the length of the ground speed vector. This mechanism includes a telescoping slide, generally designated by numeral 150, one end of which is pivotally connected to the true airspeed carriage 55 shown previously in Fig. 5 and the other end of which is connected pivotally to the pin 72 projecting from the outer end of the arm 70. The length of this slide between the pivotal connections to the true air speed carriage and the wind arm represents the value of the ground speed. The telescopic slide 150 includes an elongated supporting member 151 pivotally connected intermediate its ends to the carriage 55, an intermediate sliding member 152 mounted for sliding movement longitudinally of member 151, and an inner sliding member 153 mounted for sliding movement longitudinally of member 152.

Since this mechanism is a mechanical representation of the vector triangle shown in Fig. 4, the variable length of the slide 150 between the pivot 72 and the axis of rotation of the supporting member 151 continuously represents the ground speed vector and hence is continuously proportional to the magnitude of the ground speed. This length varies as a function of the position of the carriage 55 as determined by the true air speed; the angular position of arm 70 controlled both by the wind direction and by the compass heading; and the radial position of arm 70 relative to its axis of rotation as controlled by the wind speed.

In order to convert the instantaneous length of the slide 150 into an output proportional to the ground speed, a suitable means is provided for continuously measuring the length of the telescoping slide 150. This means includes a ground speed pulley 154 mounted on carriage 55 for rotation about an axis coincident with the axis about which member 151 is pivoted, and a fine flexible cable 155 connected at one end to the innermost end of the inner sliding member 153 and wound around the ground speed pulley 154. In order to insure accurate measurement of the length of the slide 150, it is essential that the cable 155 continuously pass through a point coincident with the axis of rotation of the supporting member 151. This condition is maintained by threading the cable 155 over the idler pulley 156, rotatably mounted on member 151 and disposed as shown in Fig. 9. A suitable biasing means such as a clock spring (not shown) may be arranged to continuously apply torque to the ground speed pulley 154 in order to maintain tension on the cable 155 at all times. With this arrangement the angular position of the pulley 154 and the shaft upon which it is mounted continuously corresponds to the length of the ground speed slide 150.

Figure 10:
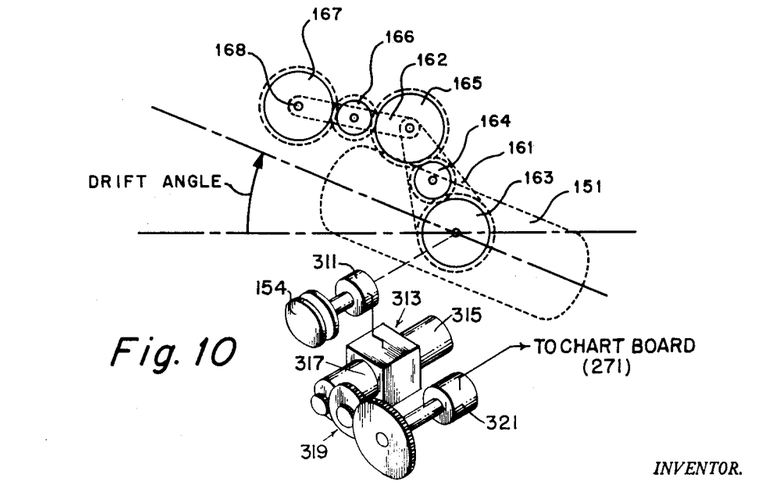
Fig. 10 is a schematic representation of the mechanism within the vectorial computing mechanism for continuously measuring the drift angle, and the mechanism responsive to the measured ground speed to generate an output signal proportional thereto.

Considering next the showing in Fig. 10, the angular position of the ground speed pulley 154 is continuously translated into a proportional electrical signal by a potentiometer 311 housed within the ground speed slide 151 and disposed coaxially with said pulley with its wiper fastened to the shaft upon which the ground speed pulley is mounted, as indicated schematically in Fig. 10. With this conversion of the ground speed information into an electrical signal it may be transmitted more readily to the relatively fixed portion of the computer assembly from the moving true air speed carriage upon which the ground speed slide is mounted and thence to the rate servo unit, generally designated by the reference numeral 313. The rate servo unit 313 includes a motor 315 operating at a rate proportional to the signal emanating from the potentiometer 311 and an induction generator 317 driven at a speed continuously proportional to the ground speed by a mechanical connection to the motor 315. The shaft of the induction generator 317 is mechanically connected through a suitable gear train generally designated by the reference numeral 319 to a ground speed rate transmitter synchro 321, which continuously generates a voltage proportional to the ground speed for transmission to the chart board assembly.

Since it is also desirable to express the ground speed in terms of a shaft position for use in driving the ground speed counter 35 located on the face of the computer assembly as shown in Fig. 2, for this purpose, a suitable servo mechanism is arranged to drive the ground speed counter through a suitable gear train.

In order to determine course information it is necessary to compute the drift angle between the true airspeed vector and the ground speed vector. A mechanism for continuously measuring the drift angle is also shown schematically in Fig. 10. This mechanism includes a pair of pivotally connected arms 161 and 162 arranged to support a plurality of gears 163, 164, 165, 166, and 167. Gear 163 is mounted on the true airspeed carriage 55 coaxially with member 151 and attached thereto for rotation therewith. With this arrangement, the angular position of gear 163 continuously corresponds to the drift angle and changes therein. However, since gear 163 must be mounted on the true air speed carriage, which is subject to translational movement within the computer assembly it is necessary to provide means for transferring the information obtained by gear 163 to a relatively fixed station independent of either the position of the true airspeed carriage or translational movement thereof. This result is accomplished by the use of the pivotally interconnected links 161 and 162 bearing the intermeshing train of gears 164, 165, 166, and 167, by means of which angular displacement of the gear 163 is continuously duplicated in gear 167 rotatably mounted on the shaft 168 mounted in a relatively fixed position within the computer assembly. This angular displacement of gear 167 is in turn transmitted to gear 104 fixedly secured to the spider assembly 102 of the course differential assembly generally designated by numberal 100 in Fig. 6. Referring again to Fig. 6, since the gear 106 of differential assembly 100 is continuously positioned according to the compass heading, the values of the heading and the drift angle are continuously summed algebraically in the differential assembly 100 to produce rotation of the upper gear 108 which represents the course. The gears 106 and 108 are connected by a suitable mechanical linkage to the needle 27 and pointer 36, respectively, in the indicator assembly 28 on the face of the computer assembly 21. In addition, a conventional transmitting synchro unit 331 geared by means of pinion gear 332 to the upper gear 108 converts the course information represented by the angular position of the gear into an electrical signal for transmission from the computer assembly.

With the mechanisms described above the computer assembly continuously obtains and transmits electrical signals representing the actual course made good and the ground speed of an aircraft.

The chart board assembly arranged to make direct use of the information supplied by the computer assembly described above is a very compact and completely automatic polar plotter, housed in a unit as shown in Fig. 3 only slightly larger overall than the conventional manual chart board for use in single place aircraft. Since the external features of the chart board assembly are described in detail above in relation to Fig. 3, the following description will be devoted entirely to the driving mechanism enclosed within the housing designated by reference numeral 43 in Fig. 3.

As noted briefly above, the chart board assembly 41 of the instant invention provides means for driving a circular section of a conventional chart beneath a relatively fixed pen assembly. This driving means includes a pair of rotatable driving disks 201 and 202 shown in Fig. 11 and represented schematically in Figs. 12 and 13 in relation to the differential driving mechanisms therefor.

Figure 11:
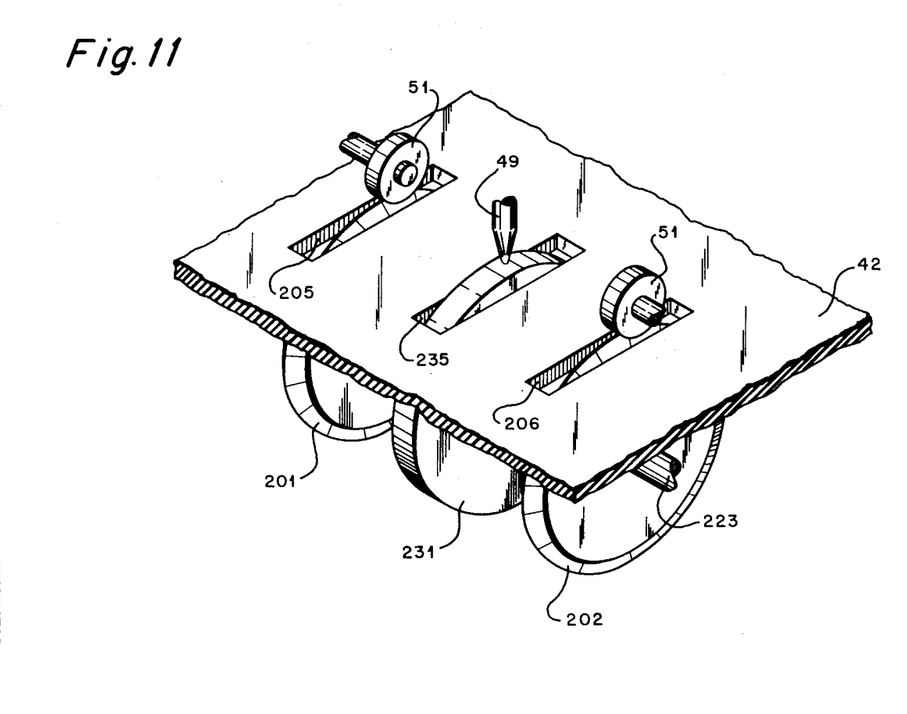
Fig. 11 is detailed isometric view showing the relationship of the chart driving disks to the roller members, and the relationship of the chart supporting wheel to the pen assembly.
Figure 12:
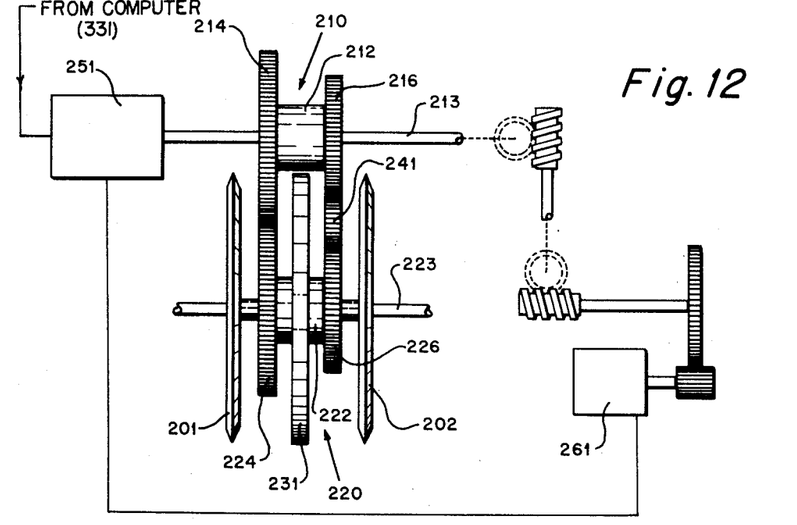
Fig. 12 is schematic representation of the portion of the drive mechanism in the chart board assembly by means of which the course computed by the computer assembly is transmitted to the chart on the chart board.
Figure 13:
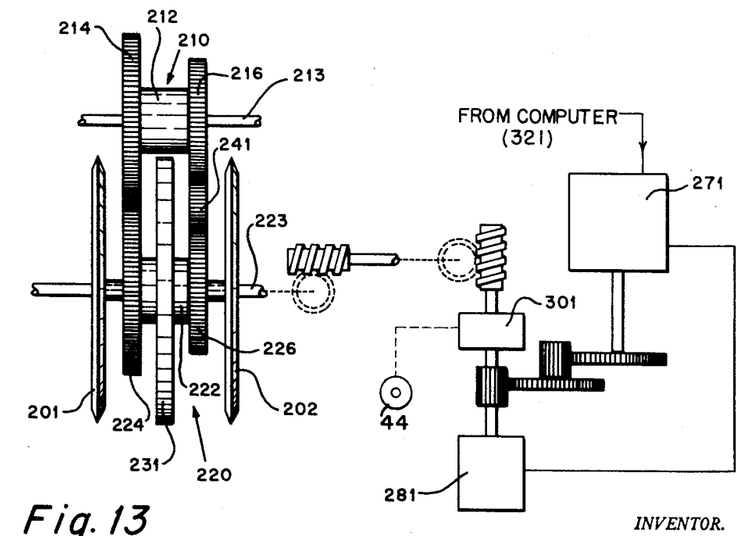
Fig. 13 is a schematic representation of the portion of the drive mechanism in the chart board assembly by means of which the ground speed computed by the computer assembly is transmitted to the chart on the chart board.

Referring to Fig. 11 in particular, the driving disks 201 and 202 are so disposed beneath the backing plate 42 that they project slightly through the slots 205 and 206, respectively, to engage the underside of any chart placed under the transparent cover sheet 46 of the chart board assembly. In order to insure accurate movement of a chart in response to rotation of the driving disks, the chart board assembly includes a pair of freely rotatable rollers 51 supported directly above the respective driving disks by the fingers 50 as shown in Fig. 3. If necessary, these fingers 50 may be permanently deflected downwardly so that the rollers 51 press a chart against the driving disks with increased force to eliminate slippage. A pen assembly 49, supported as shown in Fig. 3 by the finger 48, is disposed midway between said driving disks for engagement with the upper surface of a chart passing beneath it. In order to insure proper operation of the pen assembly to produce an uninterrupted course line on a chart, the driving mechanism also includes a chart supporting wheel 231 projecting through slot 235 in backing plate 42 in the manner shown in Fig. 11 and having a flattened cylindrical outer edge, the uppermost point of which is disposed immediately beneath the point of the pen assembly. The wheel 231 is fixedly secured to the spider assembly 222 of the driving mechanism, as indicated in Figs. 12 and 13, and has an outside diameter equal to that of disks 201 and 202. Consequently, it rotates with the driving mechanism so that its outer surface moves continuously under the pen assembly at a rate constantly coincident with the translational movement of a chart supported thereby, so that the support provided by wheel 231 is not at the expense of additional friction drag.

The rate of rotation of the respective driving disks 201 and 202 is continuously regulated by the course and ground speed components of the chart driving mechanism to produce the desired movement of a chart beneath the pen assembly 49. The basic chart driving mechanism of the chart board assembly consists of two mechanical differential assemblies generally designated by the reference numerals 210 and 220 in Figs. 12 and 13. These two differential assemblies are arranged on parallel axes and geared together as indicated in Figs. 12 and 13. In addition, the chart driving disks 201 and 202 are fixedly secured to the gears 224 and 226 respectively, of the differential assembly 220 for rotation therewith. This type of double differential drive is necessary in order to permit the imposition of two independent motions, the course and the ground speed, on driving disks 201 and 202 at the same time without mutual interference so that the effect of these motions is purely additive.

Referring now to Fig. 12 in particular, for a detailed description of the course portion of the driving mechanism, it will be assumed that there is no rotary motion of the shaft 223 to which the spider assembly 222 of the ground speed differential assembly 220 is fixedly attached. Under this condition rotation of the shaft 213 and the course spider assembly 212, fixedly secured thereto, will produce simultaneous rotation of gears 214 and 216 in the same direction at the same angular rate. This rotation of gear 216 is transmitted through the idler 241 to gear 226 and thence directly to the driving disk 202 to produce rotation of the disk in the same direction as gear 216. The rotation of gear 214 is transmitted to gear 224 and thence to driving disk 201. However, due to the absence of an intermediate idler gear rotation of the gear 224 and disc 201 is in a direction opposite to that of gear 214. In this connection, the driving disks 201 and 202 may conveniently be spaced apart a distance exactly equal to the maximum diameter of these disks, so that with the disks rotating in opposite directions one revolution of these discs results in a three hundred and sixty degree (360°) rotation of the chart driven thereby. Shaft 213 is connected at one end to the course follow-up synchro 251 and at the other end to the course drive motor 261 through a uni-directional worm and wheel drive. With the chart board assembly connected to the computer assembly any difference in angular position between the course follow-up synchro 251 and the course transmitting synchro 331 in the course and ground speed computer assembly courses a servo amplifier voltage to be applied to the course motor 261 to drive shaft 213, and hence the course mechanism mounted thereon, in a direction to minimize the voltage and re-align the synchro shafts. In this manner, the course information transmitted from the course and ground speed computer is continuously effective to position a chart in azimuth. Noting that the immobility of the shaft 223 has been assumed in the above discussion, the spider assembly 222 mounted on shaft 223 and the chart supporting wheel 231 fixedly secured thereto will remain immobile without interference with angular displacement of the chart since the opposed rotation of the respective discs 201 and 202 described above will produce angular displacement of the chart about a point coincident with the point of contact between the pen assembly 49 and the uppermost point of the chart supporting wheel 231.

Referring next to Fig. 13 in particular for a detailed description of the ground speed portion of the chart drive mechanism, it will be assumed that shaft 213 is at rest. Since the ground speed spider assembly 222 is fixedly secured to the shaft 223, rotation of the shaft 223 and the accompanying rotation of the spider assembly 222 will produce simultaneous rotation of gears 224 and 226 in the same direction and at the same angular rate. Moreover, since the gears 224 and 226 are fixedly secured to the driving disks 201 and 202, respectively, this simultaneous rotation of the gears will produce corresponding rotation of the driving disks in the same direction and both at the same angular rate. The shaft 223 is connected at one end through a suitable uni-directional drive to the ground speed rate follow-up synchro 271 and to the ground speed drive motor 281. When the chart board assembly is connected to the course and ground speed computer assembly, the angular difference in synchro shaft positions between the ground speed rate transmitter synchro in the computer assembly and the ground speed rate follow-up synchro 271 in the chart board driving mechanism results in a corresponding voltage being applied to the ground speed drive motor 281 to produce rotation of shaft 223 in the direction to re-align the synchro shafts. With this arrangement, the ground speed rate obtained in the computer assembly is continuously reproduced as a shaft velocity in the chart board and transmitted through the driving disks to produce the proper translational movement of the chart. Noting that the chart supporting wheel 231 is fixedly secured to the spider assembly 222 and thence to the shaft 223 and that the wheel 231 has the same outside diameter as the discs 201 and 202, the rate of movement of the outer surface of the wheel 231 beneath the pen assembly 49 is continuously coincident with the rate of translational movement of the chart induced by concurrent rotation of discs 201 and 202.

The quantities calculated by the computer assembly have certain inherent characteristics which must be considered in designing the means for converting these quantities into a form suitable for transmission to the remotely located chart board. It is characteristic of the course information calculated by the computer that only changes in the course are significant once the chart is properly oriented on the chart board. Thus, this significant portion of the computer output representing the course may have a finite value in either of two senses, depending upon the direction in which the course is changing, clockwise or counterclockwise. In addition, it will have a zero value during intervals in which the course remains unchanged. In order to render this significant course information readily available for transmission to the chart board assembly, it is only necessary to start with the mechanical angular representation of the size and direction of the drift angle provided by the mechanism shown schematically in Fig. 10, add it algebraically to a similar mechanical angular representation of the aircraft heading by means of the differential assembly 100 in the manner described in greater detail above, and then convert any changes in the resulting mechanical representation of the course into corresponding electrical signals by means of the course transmitter synchro 331. With this arrangement, there is no signal generated by the course transmitter synchro as long as the course remains unchanged. However, when the course changes in either direction, the course transmitter synchro 331 generates a signal corresponding both in sense and magnitude to the course change, which is effective in the manner described above to produce appropriate angular movement of the chart about the pen assembly on the chart board assembly.

In contrast, it is characteristic of the computer output signal representing the ground speed that it continuously has a finite value in only one sense, and hence varies only in magnitude. Moreover, in this instance, the entire quantity representing the total magnitude of the ground speed is significant. Therefore, it is preferable to provide a rate servo unit 313 in the system for rendering the significant ground speed information readily available for transmission to the chart board assembly. As noted in greater detail above, the length measurement of slide 150, shown in Fig. 9, is converted into a directly proportional electrical signal by a potentiometer 311 arranged to cooperate with the ground speed pulley 154. Next, the signal produced by the potentiometer 311 is used to regulate the rate of rotation of the motor 315 of the rate servo unit 313, which also includes an induction generator 317 driven by the motor 315. This rate servo unit must be arranged to insure linearity so that the speed of the generator 317 is directly proportional to the ground speed. Finally, the generator 317 is mechanically connected by means of a suitable gear train 319 to the ground speed rate transmitter synchro 321. Hence, whenever the ground speed remains constant, the signal produced by the potentiometer remains unchanged so that the rate of rotation of the ground speed rate transmitter synchro 321 remains constant and is matched by a corresponding constant rate of translational movement on the part of the chart on the chart board. On the other hand, whenever the ground speed varies in either direction, the responsive change in the signal produced by the potentiometer 311 is changed accordingly, resulting in a change in the rate of rotation of the ground speed rate transmitting synchro 321 and a corresponding change in the rate of translational movement of the chart across the chart board.

In the interest of increased versatility of the chart board assembly, it is desirable that the chart board be readily adaptable for use with charts having various different standard scales. Since it is characteristic of the driving mechanism described above that the velocity of the ground speed drive motor 281 has a unique and linear correspondence to the ground speed, it is possible to provide this increased versatility of the chart board by incorporating a suitable speed changing mechanism in the gear train between the drive motor 281 and the chart driving disks 201 and 202. This speed changing mechanism, represented in Fig. 13 by a box designated by the numeral 301, may conveniently comprise a conventional cam driven gear-shifting mechanism manually controlled by a knob 44 shown schematically in Fig. 13 and mounted adjacent the edge of the chart board assembly in the manner indicated in Fig. 3.

A complete understanding of the unique features of the subject invention will be facilitated by thorough consideration of the following description of the operation of the entire navigational system comprising the instant invention. Beginning with the inputs supplied to the computer assembly, the true air speed is continuously supplied to the computer assembly by means of an electro-mechanical link with a suitable air speed measuring instrument. The position of the carriage 55 is continuously adjusted by the mechanism shown schematically in Fig. 5 in response to this true air speed input. The aircraft heading is continuously supplied by a suitable electro-mechanical linkage with a remotely located heading indicating instrument. The arm 70 is continuously positioned angularly in accordance with this heading information by means of a portion of the mechanism schematically represented in Fig. 6. The wind direction and changes therein are intermittently supplied manually to the computer assembly by operation of the crank 31. Whenever the crank 31 is manipulated the angular position of arm 70 is modified accordingly by means of another portion of the mechanism represented schematically in Fig. 6. In the event of a change in the wind speed this changed information is introduced manually in the computer assembly by means of crank 33. The radial position of arm 70 is modified in response to operation of the crank 33 by means of the mechanism shown schematically in Fig. 8. The cumulative effect of the four inputs described above is to continuously adjust the positions of arms 70 and 150 and of carriage 55 to maintain an exact mechanical equivalent as shown in Fig. 9 of the vector triangle shown in Fig. 4. The next item to be considered is the information supplied as outputs by the computer assembly. Referring again to the mechanical representation of the vector triangle as shown schematically in Fig. 9, the length of telescopic slide 150 between its pivotal support on carriage 55 and the pivot 72 at its outer end is in direct linear relationship to the instantaneous ground speed of the aircraft. This length of the slide 150 is continuously measured and transmitted by a suitable electro-mechanical link to the ground speed rate transmitter synchro as a shaft position. Changes in the shaft position of the ground speed rate transmitter synchro are transmitted as electrical impulses to the ground speed rate follow-up synchro 271 in the chart board driving mechanism. Meanwhile, since changes in the angular position of the slide 150 represent changes in the drift angle, these changes are continuously transmitted through the gear train shown schematically in Fig. 10 to the gear 104 on the spider 102 of the differential assembly 100 shown in Fig. 6, to be added algebraically to the heading introduced through gear 106 of differential assembly 100 to produce in gear 108 a rotation corresponding to the change in course. Changes in the position of gear 108 are continuously transmitted by a suitable gear train to the course transmitter synchro into which they are introduced as shaft rotations. Changes in the position of the shaft in the course transmitter synchro are transmitted as electrical impulses to the course follow-up synchro 251 in the chart board driving mechanism.

In the chart board driving mechanism the electrical signal imposed upon the ground speed rate follow-up synchro 271 results in energization of the drive motor 281 in the direction to neutralize the signal imposed on the synchro 271, thus producing a corresponding variation in the rate of rotation of the driving disks 201 and 202 in the same direction. The signal imposed upon the course follow-up synchro 251 results in energization of the drive motor 261 for rotation in the direction to neutralize the signal imposed on synchro 251, thus producing a corresponding rotation of the driving disks 201 and 202 in opposite directions. Since the drive motors 261 and 281 operate simultaneously, their rotation produces an additive effect upon the driving disks 201 and 202, which in turn, produces movement of a chart in a direction and at a rate corresponding to the course and the ground speed, respectively, of the aircraft.

The present invention provides an improved automatic aircraft navigational system including a flight track recorder capable of continuous and accurate operation over extended periods to produce a graphic representation of the ground track being followed by an aircraft in which this equipment is installed. In addition, on the chart board assembly disclosed herein, indication of the aircraft's present position upon a chart is inverse to the conventional presentation upon the devices previously used, which were arranged to move a pen over a fixed chart. With the present invention, the aircraft pilot's orientation with respect to the chart and the aircraft is always correct and unambiguous, because a chart continuously moves across the chart board toward the pilot and under the pen exactly as the ground moves beneath the aircraft. Accordingly, the transparent cover of the chart board assembly may conveniently be inscribed with a "lubber line" so that the destination of the aircraft may be made to coincide with the "lubber line" by turning the aircraft. Then, while the aircraft continues in straight-line flight, the destination as indicated on the chart passes down the "lubber line" to a point beneath the pen, arriving at this point at the same time that the aircraft should be passing over the actual location of the destination on the ground.

Obviously many modifications and variations of the present invention are possible in the light of the above teachings. It is therefore to be understood, that within the scope of the appended claims, the invention may be practiced otherwise than as specifically described above.

What is claimed is:

1. In an airborne navigational system, a vectorial computer assembly and an automatic polar coordinate chart board assembly, said vectorial computer assembly being arranged to continuously generate output signals representing ground speed and course of an aircraft, means for conveying the output signals of said computer assembly to said chart board assembly as input signals, said chart board assembly being responsive to input signals representing ground speed and course of an aircraft, and having a drive mechanism provided with a pair of chart driving disks operatively connected to concurrently continuously operable first and second differential mechanisms, the first differential being arranged to rotate said disks in the same direction independent of concurrent operation of said second differential mechanism and the second differential being arranged to rotate said disks in opposite directions independent of concurrent operation of said first differential mechanism, a first independent controlling means operative in response to the input signal representing ground speed to drive the first differential mechanism, and a second independent controlling means operative in response to the input signal representing course to drive the second differential mechanism.

2. In an airborne navigational system, a vectorial computer assembly and an automatic polar coordinate chart board assembly, said computer assembly including means for continuously calculating useful information in terms of vector quantities, and means interconnecting said computer assembly and said chart board assembly for conveying the instantaneous vector quantities calculated by the computer assembly to the chart board assembly, said chart board assembly including a drive mechanism provided with a pair of chart driving disks operatively connected to first and second differential mechanisms operable in response to information supplied as vectorial quantities, each differential mechanism comprising a spider assembly fixedly mounted on a supporting shaft and a pair of end members rotatably mounted on the supporting shaft adjacent opposite ends of the spider assembly and in engagement with means within said spider assembly for selectively rotating both in opposite directions relative to the spider assembly and both together in one direction with the spider assembly, the disks being directly connected to the respective end members of the first differential for simultaneous rotation in the same direction in response to rotation of the spider assembly of said first differential mechanism and being indirectly connected to the respective end members of the second differential with an idler gear interposed between one disk and its corresponding end member, whereby simultaneous rotation of the end members of the second differential in the same direction in response to rotation of the spider assembly of said second differential mechanism produces simultaneous rotation of the disks in opposite directions, a first independent controlling means operative to drive the end members of the first differential mechanism in the same direction by rotating their supporting shaft and the spider assembly attached thereto, and a second independent controlling means operative to drive the end members of the second differential mechanism in the same direction by rotating their supporting shaft and the spider assembly attached thereto.

3. In an airborne navigational system, a vectorial computer assembly and an automatic polar coordinate chart board assembly, said vectorial computer assembly being arranged to continuously generate output signals representing ground speed and course of an aircraft, means for conveying the output signals of said computer assembly to said chart board assembly as input signals, said chart board assembly being responsive to input signals representing ground speed and course of an aircraft, and having a drive mechanism provided with a pair of chart driving disks operatively connected to first and second differential mechanisms, each comprising a spider assembly fixedly mounted on a supporting shaft and a pair of end members rotatably mounted on the supporting shaft adjacent opposite ends of the spider assembly and in engagement with means within said spider assembly for selective rotation both in opposite directions relative to the spider assembly and both together in one direction with the spider assembly, the disks being directly connected with the respective end members of the first differential for simultaneous rotation in the same direction in response to rotation of the spider assembly of said first differential mechanism and being indirectly connected to the respective end members of the second differential with an idler gear interposed between one disk and its corresponding end member, whereby simultaneous rotation of the end members of the second differential in the same direction in response to rotation of the spider assembly of said second differential mechanism produces simultaneous rotation of the disks in opposite directions, a first independent controlling means operative in response to the input signal representing ground speed to drive the end members of the first differential mechanism in the same direction by rotating their supporting shaft and the spider assembly attached thereto, and a second independent controlling means operative in response to the input signal representing course to drive the end members of the second differential mechanism in the same direction by rotating their supporting shaft and the spider assembly attached thereto.

4. An automatic polar coordinate chart board assembly including a fixed pen assembly arranged to trace a line upon a chart passed beneath it and a chart drive mechanism operable to move a chart beneath the pen assembly, said chart drive mechanism comprising an identical pair of relatively sharp edged chart driving disks rotatably mounted upon a common axis and spaced apart a substantial amount for engagement with spaced points on a chart, a first drive motor responsive to an input signal proportional to changes in course of an aircraft, a first differential assembly driven by the first drive motor and operable to produce opposite rotation of said driving disks, a second drive motor responsive to an input signal representing ground speed of an aircraft, and a second differential assembly driven by the second drive motor and independently operable to produce simultaneous rotation of said driving disks in the same direction, whereby the combined effect of said first and second differentials upon the rotation of said driving disks produces movement of a chart which results in tracing the path of movement of an aircraft upon the chart.

5. A device as described in claim 4 in which said driving disks are spaced apart so that their edges are separated by a distance equal to the diameter of said disks, whereby one complete rotation of said disks in opposite directions produces a 360° rotation of a chart driven thereby.

6. A device as described in claim 5, and, in addition, a manually controlled speed changing mechanism interposed between said second driving motor and said second differential assembly, whereby the rate at which the second differential operates in response to rotation of the drive motor can readily be adjusted to correspond to charts having various standard scales.

7. An automatic polar coordinate chart board assembly including a generally planar backing plate having a relatively large circular depression in its upper surface, a transparent cover sheet divided into two mated portions, the first portion fixedly connected to said backing plate having an extended area projecting over the central portion of said backing plate and the second portion being movable to provide access to the depression in the backing plate, hinge means pivotally interconnecting said first and second portions of the cover sheet, a pen assembly mounted in the extended area of said first portion and projecting downwardly into said depression, a plurality of openings in the central portion of said backing plate and a chart drive mechanism mounted on the under side of said backing plate and having a plurality of chart driving means projecting upwardly through said openings into said depression, whereby operation of said chart drive mechanism produces movement of said chart driving means effective to move a relatively small circular section of chart beneath said pen assembly.

8. A device as described in claim 7 in which said chart driving means comprise a pair of identical sharp edged driving disks arranged with one edge of each projecting very slightly through said backing plate and said chart drive mechanism includes a first differential assembly arranged to impose opposite rotation upon said driving disks and a second operatively interconnected differential assembly arranged to simultaneously impose an independent rotation in the same direction upon said driving disks.

9. A device as described in claim 8 in which the first differential assembly is operable in response to a signal proportional to changes in the course of an aircraft and the second differential assembly is operable in response to a signal proportional to the ground speed of an aircraft, whereby the movement of a chart beneath said pen assembly is such that the line traced represents the path along which an aircraft is traveling.

10. An automatic polar coordinate chart board assembly including a fixed pen assembly arranged to trace a line upon a chart passed beneath it and a chart drive mechanism operable to move a chart beneath the pen assembly, said chart drive mechanism comprising an identical pair of relatively sharp edged chart driving discs rotatably mounted upon a common axis and spaced apart so that their edges are separated by a distance equal to the diameter of said discs for engagement with spaced points on a chart, a first drive motor responsive to an input signal proportional to changes in course of an aircraft, a first differential assembly driven by the first drive motor and operable to produce opposite rotation of said driving discs, a second drive motor responsive to an input signal representing ground speed of an aircraft, a second differential assembly driven by the second drive motor and independently operable to produce simultaneous rotation of said driving discs in the same direction, and a manually controlled speed changing mechanism interposed between said second driving motor and said second differential assembly, whereby complete rotation of said discs in opposite directions produces a 360° rotation of the chart driven thereby and the rate at which the second differential operates in response to rotation of the drive motor can readily be adjusted to correspond to charts having various standard scales so that the combined effect of said first and second differentials on the rotation of said driving discs produces movement of the chart which results in tracing the path of movement of an aircraft upon the chart.

11. For use in air navigation, an electro-mechanical vectorial computer assembly including an adjustable mechanism having first, second, and third sides arranged to represent a vector triangle provided with first, second, and third sides, all adjustable in length, a first regulating means responsive to a continuously supplied variable input representing true air speed, a second regulating means responsive to a continuously supplied variable input representing compass heading, a third regulating means responsive to an intermittently modified input representing relative wind direction, a fourth regulating means responsive to an intermittently modified input representing wind speed, said second, third, and fourth regulating means being independently operable and collectively effective to adjust the angular disposition of said second side relative to said first side and the length of said second side, all relative to a fixed point at the intersection of said first and second sides, a supporting element rotatable about said fixed point, an elongated member comprising said second side supported by and adjustable radially relative to said rotatable supporting element, first, second, and third identical gears mounted coaxially with said supporting element at spaced intervals along and independently rotatable about a common axis intersecting said fixed point, first and second differential mechanisms each including an intermediate spider assembly and first and second end members rotatable in opposite directions relative to the spider assembly, means fixedly interconnecting said supporting element and the second said gear for concurrent rotation about the common axis, an idler gear operably interconnecting said second gear and the first end member of each of said first and second differential mechanisms, said second end member of said first differential mechanism and said second end member of said second differential mechanism operatively engaging said first gear and said third gear, respectively, said second regulating means including driving means operatively engaging said first gear for angular displacement thereof corresponding to changes in compass heading and concurrent angular displacement of said second and third gears through said differential mechanisms and said idler gear, said third regulating means including an irreversible drive operable to rotate the spider assembly of said first differential mechanism and operable through engagement of the second end member of said first differential assembly with said first gear to displace said second gear angularly relative to said first gear in response to changes in wind direction, and said fourth regulating means including an irreversible drive connected to the spider assembly of said second differential assembly and operable through engagement of the second end member of said second differential assembly with said third gear to produce relative angular displacement of said third gear relative to said second gear, and means responsive to angular displacement of said third gear relative to said supporting element to displace said elongated member radially relative to said supporting element in response to changes in wind speed, whereby each of said second, third and fourth regulating means is continuously positively connected through said supporting element to the elongated member comprising the said second side of said vector triangle and continuously positively displaced as necessary in response to movement of every other regulating means controlling the second side of said triangle to compensate for such movement.

References Cited in the file of this patent

UNITED STATES PATENTS

| | | |
|---|---|---|
| 1,433,595 | Baule | Oct. 31, 1922 |
| 1,453,377 | Campbell | May 1, 1923 |
| 1,701,582 | Mengden | Feb. 12, 1929 |
| 2,502,991 | Rast | Apr. 4, 1950 |
| 2,538,226 | Anderson et al. | Jan. 16, 1951 |
| 2,567,984 | Wood | Sept. 18, 1951 |
| 2,569,505 | Thrash | Oct. 2, 1951 |
| 2,582,681 | Coe | Jan. 15, 1952 |
| 2,598,096 | Bailly | May 27, 1952 |
| 2,636,673 | McGee | Apr. 28, 1953 |
| 2,669,500 | Och | Feb. 16, 1954 |
| 2,675,291 | Webster | Apr. 13, 1954 |
| 2,746,151 | Kennedy | May 22, 1956 |